(12) United States Patent
Stephens et al.

(10) Patent No.: US 8,576,730 B2
(45) Date of Patent: Nov. 5, 2013

(54) METHOD AND SYSTEM FOR DETERMINING LOCALITY USING NETWORK SIGNATURES

(75) Inventors: Spencer Stephens, Toluca Lake, CA (US); Kenneth W. Long, Burbank, CA (US); Craig Davis Cuttner, Norwalk, CT (US); Conor P. Cahill, Waterford, VA (US)

(73) Assignee: Time Warner, Inc., New York, NY (US)

( * ) Notice: Subject to any disclaimer, the term of this patent is extended or adjusted under 35 U.S.C. 154(b) by 891 days.

(21) Appl. No.: 11/093,602

(22) Filed: Mar. 30, 2005

(65) Prior Publication Data

US 2005/0226152 A1    Oct. 13, 2005

Related U.S. Application Data

(60) Provisional application No. 60/558,004, filed on Mar. 31, 2004.

(51) Int. Cl.
*H04L 1/00* (2006.01)

(52) U.S. Cl.
USPC ........ 370/252; 370/230; 370/235; 455/404.2; 455/456.1

(58) Field of Classification Search
USPC .............. 370/229, 230, 230.1, 231, 232, 235, 370/236, 338, 328, 241, 252; 455/404.2, 455/456.1–457
See application file for complete search history.

(56) References Cited

U.S. PATENT DOCUMENTS

| | | | |
|---|---|---|---|
| 5,946,359 A * | 8/1999 | Tajiri et al. | 375/331 |
| 6,002,708 A | 12/1999 | Fleming | |
| 6,127,976 A | 10/2000 | Boyd | |
| 6,269,246 B1 * | 7/2001 | Rao et al. | 455/456.3 |
| 6,577,275 B2 | 6/2003 | Turner | |
| 6,593,885 B2 | 7/2003 | Wisherd | |
| 6,655,582 B2 | 12/2003 | Wohl | |
| 6,657,586 B2 | 12/2003 | Turner | |
| 7,006,838 B2 * | 2/2006 | Diener et al. | 455/456.1 |
| 7,305,479 B1 * | 12/2007 | Morris et al. | 709/229 |

(Continued)

FOREIGN PATENT DOCUMENTS

| | | |
|---|---|---|
| JP | 2000-197148 A | 7/2000 |
| JP | 2003-177980 A | 6/2003 |

(Continued)

OTHER PUBLICATIONS

"Pint Point Local Positioning System for High Value Asset Security", RF Technologies, Inc., http://www.pinpointco.com, Jun. 6, 2005.

(Continued)

*Primary Examiner* — Ricky Ngo
*Assistant Examiner* — Wei-Po Kao
(74) *Attorney, Agent, or Firm* — Gottlieb, Rackman & Reisman, P.C.

(57) ABSTRACT

Content is distributed from a source to a sink only if the sink is within a predetermined geographic locality. In one embodiment, a signature request is sent to the sink. The sink obtains an actual signature compares it to the requested signature, and if the requested signature and the actual signature resemble each other sufficiently closely, then the content is sent to the sink The signature is compiled from parameters obtained from appropriate parameter detectors. The parameter detectors generate, detect and monitor various signals required for determining the locality of the sink.

29 Claims, 7 Drawing Sheets

(56) References Cited

U.S. PATENT DOCUMENTS

| | | | |
|---|---|---|---|
| 2002/0094012 A1 | 7/2002 | Belcher | |
| 2002/0112036 A1 | 8/2002 | Bohannon | |
| 2002/0118655 A1 | 8/2002 | Harrington | |
| 2002/0136407 A1 | 9/2002 | Denning | |
| 2002/0154777 A1* | 10/2002 | Candelore | 380/258 |
| 2002/0181565 A1 | 12/2002 | Boyd | |
| 2003/0008668 A1* | 1/2003 | Perez-Breva et al. | 455/456 |
| 2003/0063751 A1 | 4/2003 | Bruen | |
| 2003/0139190 A1* | 7/2003 | Steelberg et al. | 455/456 |
| 2003/0165241 A1* | 9/2003 | Fransdonk | 380/258 |
| 2004/0168062 A1* | 8/2004 | Isozaki et al. | 713/171 |
| 2004/0174824 A1* | 9/2004 | Ohta et al. | 370/252 |
| 2004/0236850 A1 | 11/2004 | Krumm | |
| 2005/0020277 A1 | 1/2005 | Krumm | |

FOREIGN PATENT DOCUMENTS

| | | | |
|---|---|---|---|
| WO | WO 0068764 | | 11/2000 |
| WO | WO 0167128 | | 9/2001 |
| WO | WO 0193434 | | 12/2001 |
| WO | 02/37246 | A2 | 5/2002 |
| WO | 02/089442 | A1 | 11/2002 |
| WO | WO 03075125 | | 9/2003 |
| WO | 03/107171 | A1 | 12/2003 |
| WO | 2004/017569 | A2 | 2/2004 |

OTHER PUBLICATIONS

"Working Group Areas", IEEE Standards Association, http://grouper.ieee.org/groups/, Jun. 6, 2005.

"DTCP for IP" Digital Transmission Licensing Administrator, http://www.dtcp.com, Sep. 9, 2003.

Scott Klemmer et al."An Empirical Analysis of TinyOS RF Networking (and Beyond . . . )", University of California at Berkeley.

Office Action issued by the Japanese Patent Office in the related Japanese application No. 2007-506496.

* cited by examiner

Figure 1 Example Home Networks

Figure 2 - Common IP Subnet

Figure 3 - MAC layer address of the gateway device

Figure 4 - RTT & route trace to an Internet server

Figure 5 - Common RF signature.

METHOD AND SYSTEM FOR DETERMINING LOCALITY USING NETWORK SIGNATURES

RELATED APPLICATION

This application claims priority to provisional application Ser. No. 60/558,004 filed Mar. 31, 2004, and incorporated herein by reference.

This application is also related to application Ser. No. 978,669 filed Nov. 1, 2004, now U.S. Pat. No. 7,158,800, and incorporated herein by reference.

BACKGROUND OF THE INVENTION

1. Field of Invention

This invention pertains to a method and system in which a signature is obtained from several network parameters and is used to determine whether a content sink is within a predetermined geographic locality.

2. Description of the Prior Art

The fundamental problem addressed by the invention is that there is currently no way to guarantee (with high confidence) that a content sink device (e.g., television) is actually within the home, business, or other geographically-limited region to which the content owner desires to limit the distribution, reproduction, or playback of his content from a content source. For example, if the source and the sink are connected through the Internet then they might be on opposite sides of the earth.

A case of special concern involves the use of Digital Transmission Content Protection (DTCP) (http://www.dtcp.com) protocol for copy protection over IEEE 1394, USB, MOST, and Bluetooth networks. DTCP only "secures" the link between the (5C) source and sink; there is no built-in notion of proximity between the source and sink devices. Part of the problem is solved by the (5C) standard, which guarantees (with high confidence) that a receiver is actually authorized to decode/store/playback (5C) encoded content. However, it is possible that the authorized (5C) receiver may be located too far away from the (5C) source, according to the desired rules of the content owner. So the (5C) standard per se does not solve the problem of limiting the geographic diffusion of content. Techniques that attempt to identify the receiving content user, for example by having the user enter a PIN or insert a smart card into the receiver are helpful in limiting the undesired diffusion of content outside of the owner's devices or domain, but do not address the fundamental problem that the receiving user may have placed the receiving device "too far away" from the potential content source. There are many known ways of determining the geographic location of an object.

"Triangulation" has been used for many years to establish the location of objects that emit electromagnetic radiation. This involves the use of two or more receivers with directional antennae and a geographic information database, such as a map. Given the known locations and directions of maximal received signal strength at the receivers, it is easy to find the transmitter location as the point at which lines drawn on the map from each receiver to "infinity" in the direction of maximal signal strength, intersect. In this case, the cooperation of the transmitter is not necessary, and, in fact, triangulation is often employed to locate unauthorized transmitters. A triangulation-based approach may serve the purpose of this invention, but only if the content receiver emits electromagnetic radiation, and two or more triangulation receivers are available.

More recently, it has become common for receivers to establish their positions using a Global Positioning System (GPS), which relies on measuring the differential delays of several signals transmitted from an array of GPS satellites. If the content receiver includes a GPS receiver and "return-channel" transmitter, it can convey its location back to the content source. The content source may be assumed to include a GPS receiver and/or a geographic database and means for calculating its distance from the content receiver. However, GPS does not work reliably indoors, and a receiver may be set with an incorrect location code as well.

Localization techniques that use so-called "ultra-wideband (UWB) radio" have also recently been described. For example, see U.S. Pat. No. 6,002,708.

Techniques are also known whereby proximity of receivers to transmitters is established using Round-Trip Time (RTT) measurements between a transmitted signal from the source to the sink and the corresponding return signal. In the case of a single cooperating transmitter-receiver pair, this RTT measurement may be sufficient to establish that the receiving device is "close enough" to the transmitting device that the receiving device should be authorized to decode/store/playback a specified amount of content.

One proposed, anti-diffusion solution involves the source setting the "Time to Live" (TTL) field to three in (IP) packets. This assumes that packets will traverse no more than two routers within a home network, else it is assumed that they have left the bounds of the home (some research shows that packets must typically traverse six routers to get beyond the ISP to which the home network is connected) and the third router encountered by the packet should "kill" (i.e., discard) it. A second potential solution is the measurement of RTT using DTCP-level ping messages as is done in the DTCP over IP mapping.

Another proposed solution is to require that the Wired Equivalency Protocol (WEP) be employed on (partly or wholly) wireless local networks. This addresses the cases of "unintentional sharing" of content that may occur simply by virtue of an unintended receiver being within range of a wireless content source due to:

1. innocent co-location, e.g., reception by one's neighbor, or
2. eavesdropping, e.g., by "freeloaders" parking vehicles within reception range of unprotected wireless networks.

International Patent Application number WO 03/075125 A2, mentions the use of RTT, among other mechanisms, as a means to authenticate receiving devices in a "location aware data network".

International Patent Application WO 01/93434 A2, describes the use of RTT and triangulation to enable/disable a function in a remote device in a network comprising devices that communicate over a UWB wireless medium.

U.S. patent application No. 20020136407 by Denning, et. al., describes a system/method in which data may only be decrypted at (a) specified geographic location(s). Location information is typically supplied by the GPS.

SUMMARY OF THE INVENTION

The invention pertains to a system and method which rely on several parameters related to the locality of a device or its router within the Internet and with respect to content sources. The parameters utilize certain characteristics of localized networks (e.g., but not limited to, home networks) to limit content diffusion to a desired distance from the source. These techniques are used to authorize reception by sinks within an allowed distance from the source, and prevent reception at a greater distance.

The several parameters include common IP subnet addresses, gateway MAC addresses, lengths of paths to an internet server or multimedia source, reception of RF and base cell station signals, lengths of path to home network server and monitoring of packet transfer fragmentation. These parameters may be employed all at once or a subset of parameters may be used to define a signature for a sink or content receiving device. The signatures can be recalculated at will, or on demand. If several parameters are used then the parameters may be weighted for different signatures. For example, in signatures associated with a small region, one set of parameters may be emphasized while the other parameters may be essentially ignored. For signatures associated with a larger geographic region, other parameters may be emphasized.

DETAILED DESCRIPTION OF THE INVENTION

Figure 1:
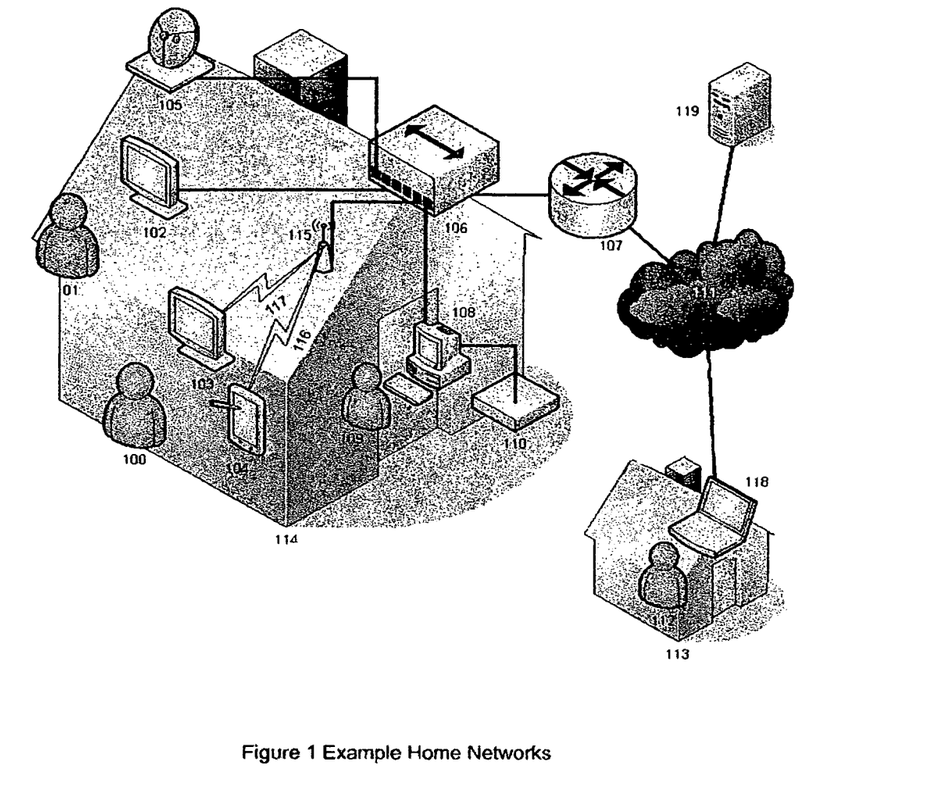
FIG. 1 shows diagrammatically a system of two networks receiving content through the Internet or from a satellite source.
Figure 1A:
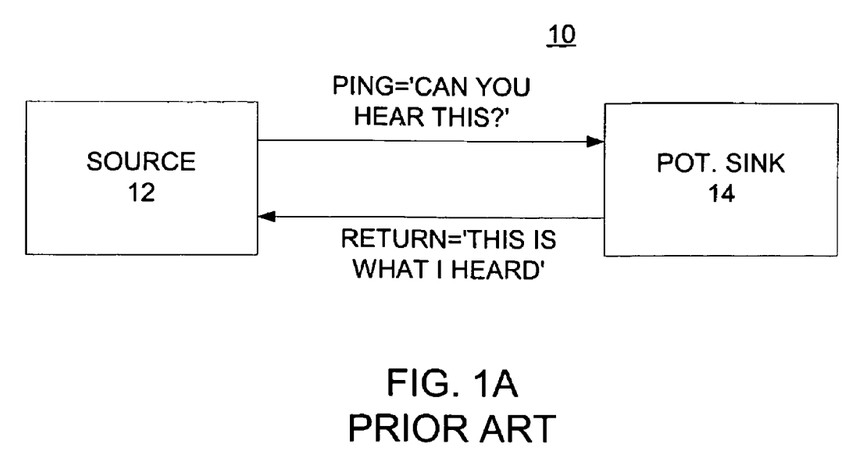
FIG. 1A shows diagrammatically a prior art system in which RTT is used to determine the distance between a content source and the intended sink.
Figure 1B:
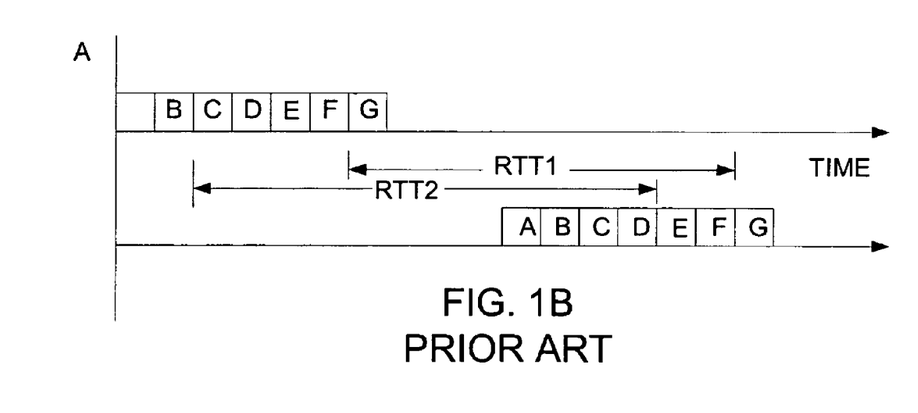
FIG. 1B shows the ping and the return signal used in the system of FIG. 1A.

FIG. 1A shows a known system 10 in which a source 12 sends a PING signal to a potential sink 14. The PING signal is asking in essence "Can you hear this?" The potential sink generates in response a RETURN signal that says "This is what I heard." In other words, the PING signal has at least one data segment of bits ABCDEFG. The RETURN signal ideally includes the same data segment. Typically, the source 12 and the sink 14 exchange messages over a distributed computer network possibly through one or more intermediate nodes (not shown). A parameter RTT1 is then defined as the time between the moment a particular portion (for example, significant bit G) is sent, and the moment the same portion is received by the source 12. Alternatively, a parameter RTT2 is defined as the distance between another portion (for example bit C) or even between two portions (bit C of PING and E of the RETURN). These parameters are then related to the distance between the source 12 and the potential sink 14. As discussed above, several PING messages are sent by the source and the parameters RTT1 and or RTT2 are determined from each corresponding RESPONSE. If any of these parameters are below a threshold value, the potential sink 14 is within the desired distance of the source 12.

The present invention provides techniques which use characteristics or signatures of networks to determine locality. An example of two home networks is shown in FIG. 1. Home A 114 consists of a collection of consumer devices including television sets 102, 103, a satellite receiver 105, a tablet PC 104 and so on. These devices are connected by wireless means (e.g., RF communication paths) to a wireless access point 115. Access point 115 is connected to network hub 106 that is also connected to a home media PC 108. PC 108 is also connected or includes mass storage 110. A router 107 connects the home network to the Internet 111.

Home B (113) includes a laptop PC 118 that is connected directly to the Internet 111 through a DSL connection or other similar relatively high speed means.

Users 100, 101, 109, 112 are operating the various devices in homes A and B to obtain Internet connection and to perform other operations.

The router 107 provides a degree of protection for home A (114) from unwanted attention by other Internet users. Whether the user 112 in home B can access devices in home A depends on the relationship between user 112 and the home A household, e.g., whether the access point 115 is restricted and/or whether users in home B (including 113) have been granted rights to access point 115.

A server 119 also connected to Internet 111 provides content exchanges.

A content provider such as a satellite operator providing audio-visual content to the home via the satellite receiver 106 desires to confine consumption of content to single households, in this case home A 114, that has the service subscription. The content provider may also be a cable operator or other relevant service provider.

There may be other reasons to confine content to the household where the content is viewable. For example, a movie studio may sell the user a DVD and desire consumption to be limited to the location where the disc is; a DVD provider or a free-to-air broadcaster might want to prevent unauthorized redistribution of the content over the Internet.

This process is referred to herein as localization of content or localization for short.

Localization is difficult to achieve in a networked world where devices are designed to communicate transparently whether they are next to each other or separated by vast distances. In this invention a method of determining is presented in which a determination is made as to whether two or more devices are local to each other through the use of signatures of the environment that each device can see. If the devices are indeed local to each other the signatures will be very similar; if the devices are far apart then the signatures will be different.

In this discussion the term "far apart" refers to the Internet connections or nodes connected to specific devices. If two homes are directly connected, for example neighbors share a common wireless network, other techniques may be required to determine localization.

As discussed above, one method of localization is the use of Round Trip Time (RTT) between devices to determine if they are local to each other. Here the source device, the device with the content, sends a "ping" message to the sink device, the device where the consumer wishes the content to go either for audiovisual consumption (i.e. the content could be audio, video, or both), for recording, or for authorized retransmission. If the time duration for the ping to be sent from source to sink and returned to sink is sufficiently short, then the source and sink are deemed to be local to each other. Another approaches uses a beacon to transmit a signal. If both the transmitter and the receiver detect the signal, they are considered to be in the same locality. Otherwise, they are not. These two techniques are described in more detail in the above-identified U.S. application Ser. No. 10/978,669.

In this invention a more sophisticated approach is taken wherein each device examines the environment around it and then the source device compares its environment with that of the sink device to determine whether they are in the "same" (or nearly the same) environment. In a preferred embodiment of the invention, several different parameters are determined, a weight is assigned to the parameters and the results are then accumulated to determine a signature related to the locality of a content receiving device. In this context the word "environment" refers to relevant aspects of the place where the device is located that can be determined by the device. The set of parameters that is determined by the environment of each device is combined into an Environment Signature. Some parameters that can be used to determine environment signatures are now described.

1. Common IP Subnet Addresses

Figure 2:
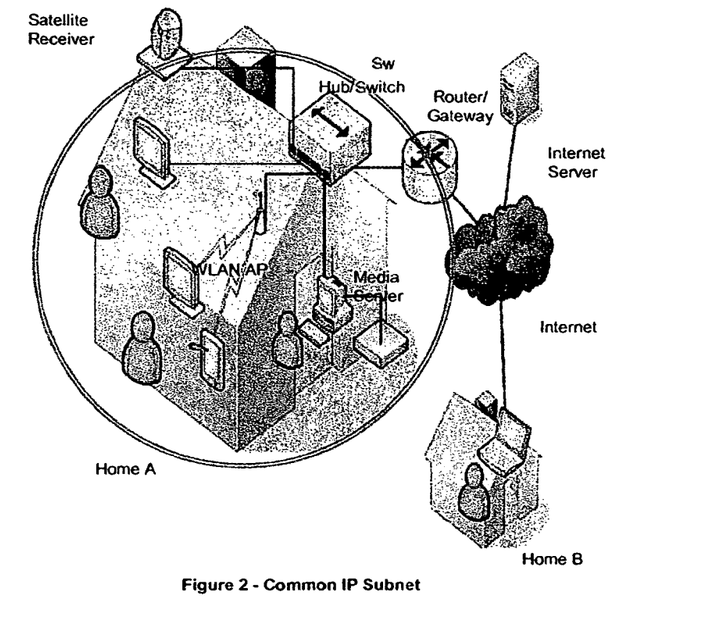
FIG. 2 shows the determination of common IP subnet in one network.

Typically, packets exchanged between Internet devices include a subnet address (IP subnet) indicating the source for the packet. Therefore packets from different routers are associated with different IP subnet addresses. Thus, the IP subnet address is indicative of whether two devices are associated with the same router or not. The concept is exemplified by FIG. 2.

2. MAC Layer Address of the Gateway Device.

Figure 3:
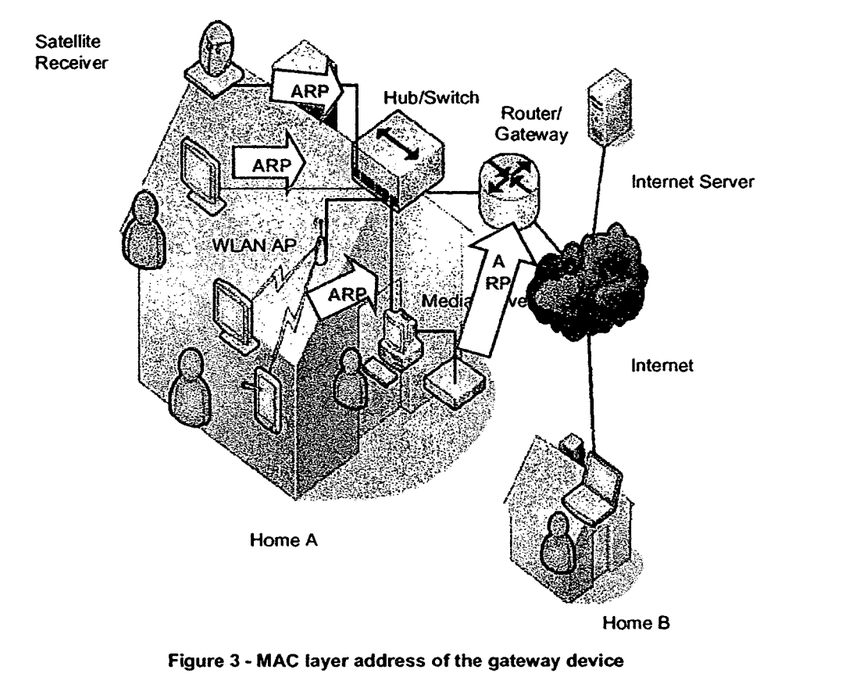
FIG. 3 shows the determination of MAC addresses in the system of FIG. 1.

The MAC address is a preprogrammed address associated with devices providing Internet. For example, in FIG. 1 the router 107 is the gateway for home network A and it has a specific MAC address. The laptop PC 118 is the gateway for home network B, FIG. 3 illustrates that any device in a network can obtain the MAC device of the respective gateway by sending to the gateway an Internet Address Resolution Protocol (ARP). The devices of network A then receive in response the MAC address of router 107. The MAC address of device 118 in network B is obviously different from the MAC address received by the devices of network A.

3. Trace Routing

Figure 4:
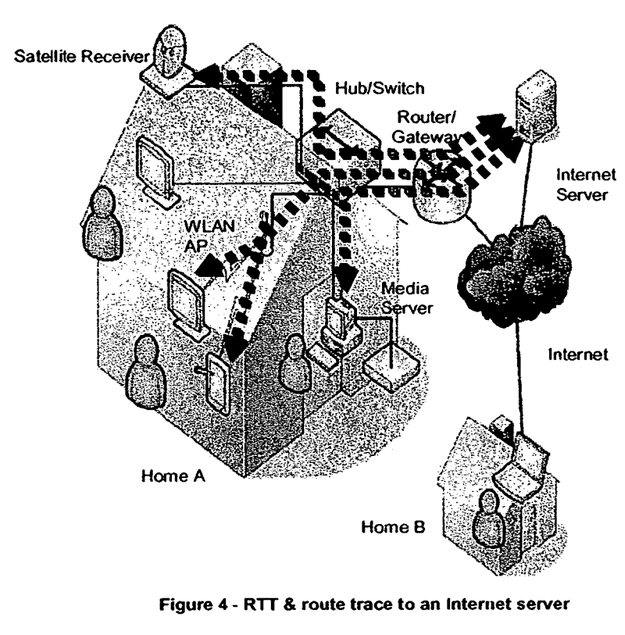
FIG. 4 shows different route traces within the system of FIG. 1.

Each of the devices of networks A and B can access the content server 119 through different paths. Of course, the paths or routing for the devices of network A will be similar to each other and different from the paths of devices in network B, as illustrated in FIG. 4. These paths can be defined and evaluated using several different techniques.

a. RTT

The routing for each device of network A share consists of three legs: device x-hub 106; hub 106-router 107; router 107-server 119. Thus, two of the three legs for the devices of network A are the same. If the RTT (the round trip time) is calculated for each device of network A, the resulting RTTs will be very similar. On the other hand, path or routing from devices of network B to server 119 generally need not share any paths with the devices from network A and therefore, the RTT for these devices is going to be very different.

b. Route to Server

Similarly, the actual paths from each device to server 119 are similar for devices for network A but different for devices of network B. These paths are obtained by using a "tracert" (trace route) command from each device. The trace route command returns an ID of all the intermediate routers or gateways between the respective device and server 119.

c. Routes to Several Designated Servers

The content owner (in this case, the entity sending content through the satellite receiver) provides the addresses of several (for example, three) Internet servers similar to server 119. Each device then pings and/or traces the route (through tracert) to all these servers and the results are compared.

4. Reception of One or More Common RF Signals

Figure 5:
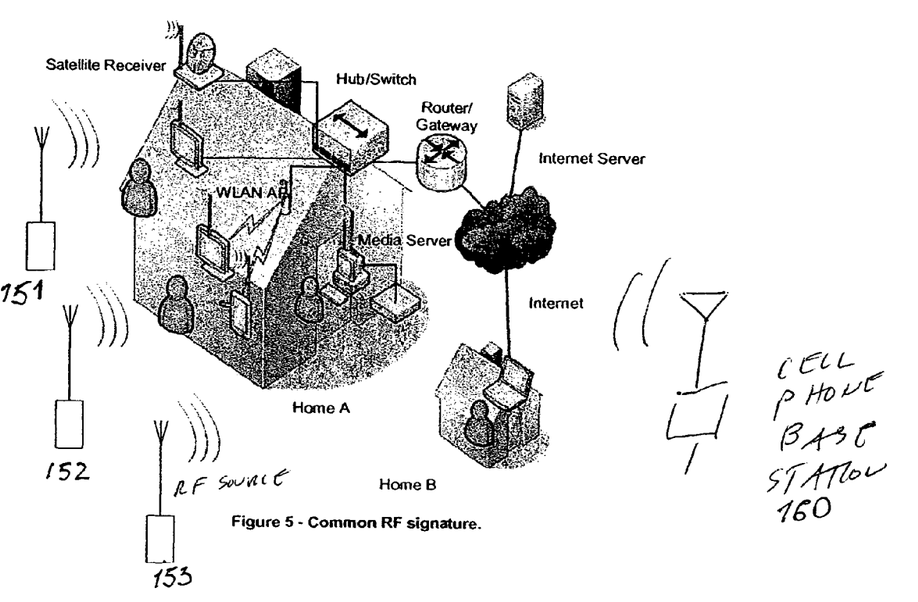
FIG. 5 shows the system of FIG. 1 with FM and cell phone base stations.

As illustrated in FIG. 5, each device of the network A is provided with an FM receiver. For determining common locality, each device then listens for signals from one or more known local FM radio stations, such as stations 151, 152 and/or 153. This technique is particularly useful when the content provider is only licensing content to be consumed in a specific geographic area. For example, for an FM radio station, the time or amplitude between modulation peaks can be measured, and/or the data being carried by the RDS (Radio Data System) channel of an FM station that utilizes RDS can also be compared. The corresponding FM parameter consists of a narrow- or wide-band RF signature, such as would traditionally be seen at the output of an RF spectrum analyzer, taking into account that such spectrum analysis can nowadays be performed mostly in software, by running a Fast Fourier Transform (FFT) or similar process, and averaging the results over some useful time interval. Alternatively, much simpler means such as utilizing the time-averaged output of an RF bandpass filter with cutoff frequencies surrounding RF frequencies of interest in forming the signature, can be used. Alternatively, this signature element can be the summation of the outputs of a set of RF bandpass filters only at certain key frequencies that, taken together, are known to provide a reliable signature element.

5. Reception of One or More Common Cell Phone Base Stations

This parameter is similar to the FM parameter discussed above, with the devices being provided with means for receiving or exchanging signals used by one or more cell phone base stations 160. The devices can then "hear" or communicate with a certain cellular base station or set of base stations. This parameter is useful when content is bound to a tight, small geographic area. For example, the content provider may wish to prevent viewing of "blacked-out" football games on cell phones with video displays that are too near the stadium in which the game is being played. Reception of a common cell-phone paging channel by both source and sink can be used as an indication of a common environment. Alternatively, the commonality of the environment can be based on the ability for both source and sink to engage in 2-way communication with (a) (set of) cellular base station(s).

6. Path to the Home Media Server

In home A 114 each device determines the path to the PC 108 being used as a home media server. The path from a device [118] in home B [113] to the home media server [108] is different even if a virtual private network is used to connect them.

7. Presence or Absence of RTT Steps Due to Packet Fragmentation

Figure 6:
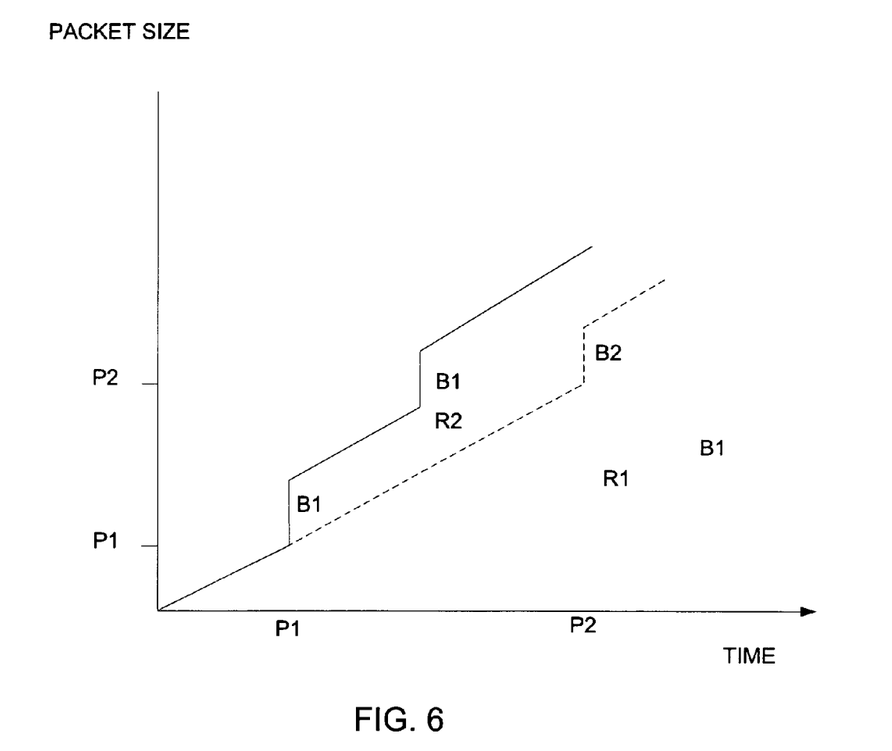
FIG. 6 shows a typical variation of packet lengths vs. time required to transmit the same over several Internet nodes.

This parameter determines or monitors how packets of various sizes are transmitted between the source and sink. It is well known that long packets may be fragmented into smaller units by routers. Local routers can handle packets of relatively large sizes while long-distance routers, such as backbone routers typically fragment long packets into smaller ones for transmission. As the smaller units are received, some computational time is required to re-assemble or defragment them into the original longer packets. This concept is illustrated in FIG. 6. In this Figure the vertical axis represents packet size and the horizontal azis represents the time required to transmit packets between the Internet nodes. In addition, R1 represents the transfer of data packets over a local network that can handle up to P1 bytes per packet and R2 represents the transfer of data packets over a higher capacity network that can handle packets of P2 bytes. In order to determine the parameter associated with packet transmission, packets are transmitted between two devices, or between a device and a server (for example by pinging). The size of the packets is gradually increased and the resulting RTT for packets is monitored. As can be seen in FIG. 6, as packet size increases, the transmission time increases substantially linearly. However when the packet size hits P1, (the maximum capacity of the Internet routers), the packets are broken up into smaller units and have to be reassembled. Therefore above P1 there is a delay of B1 that is necessary for this reassembly. A similar delay occurs at P1×2, P1×3, etc. However when the same packets are transmitted over the local network, the delays B2 occur only above packet size P2. Therefore, by examining the transmission time of data packets, the data capacity of the network is determined, and from this information, the characteristics of the network itself (e.g., whether it is a local network or a "long distance" network, for example, the Internet) can determined as well. For example, a local Ethernet-based network may allow a Maximum Transmission Unit (MTU) of 1500 bytes, while Internet routers may allow an MTU size of only 576 bytes.

Figure 7:
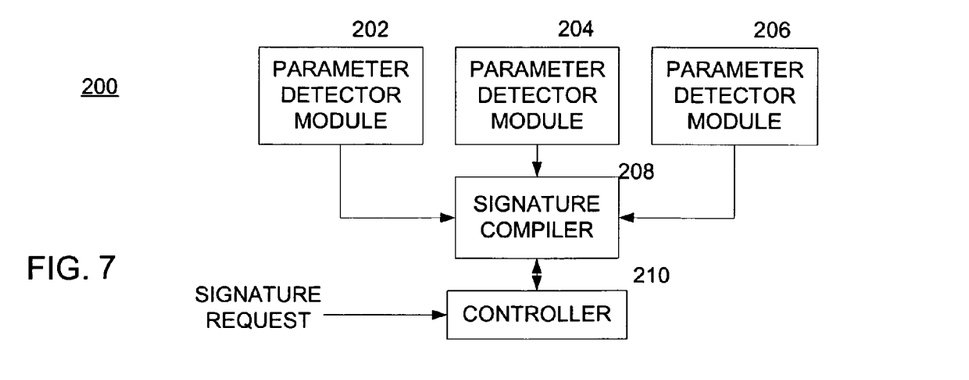
FIG. 7 shows a portion of a device of FIG. 1 used for generating signatures.

FIG. 7 shows a block diagram of a portion 200 of any of the devices of FIGS. 1-5 used to receive content. This portion can be implemented by hardware or software and is used to obtain a locality signature, based on either some or all the parameters discussed above. For this purpose, the device portion has several parameter detector modules (only three modules 202, 204, 206 being shown for the sake of clarity), each module being designed to obtain one of the respective parameters. For example, module 202 could be used to detect local FM signals and/or cell phone base signals. Module 204 could be dedicated to determine the transmission times of different sized packets in accordance with FIG. 6, Module 206 may be dedicated to determining the path to the Internet server using one or more of the three techniques described above.

The parameters obtained by the modules are compiled by signature compiler 208, either at regular intervals, or in response to a demand from a remote location. The controller 210 controls the operation of the modules and the compiler.

A content source, such as a satellite source downloading content through antenna 105, or content server 119 can be used to push or pull content, or use any other techniques to make content available to the devices of network A and/or B. In accordance with this invention, prior to downloading the content, the source may request a signature to confirm that the device meets certain requirements associated with its locality. If a signature is available, the controller sends it on to the content source. If a signature is not available, the controller activates the various modules to obtain the signature. Alternatively, the content source downloads the required signature required for the device to receive and play the respective content. The controller then obtains the actual signature from the compiler, compares it to the required signature and if a set of predetermined requirements are met, then the compiler proceeds with obtaining and playing the content. For example, signature matching (between the required and actual signatures) does not require the signatures of the source device and the sink device to be identical. In comparing each of the elements and the whole signature, a score can be calculated such that when a sufficient score is compared to a threshold value the signatures are deemed to match.

The path determined for parameters 3 or 6, above, can allow for one or two extra hops at the beginning of the path so that, for example, a home with three routers can still score within an acceptable threshold.

Other factors, such as reception of a common FM radio station, can be weighted as necessary. For example if one of the devices was unable to receive any RF signal, e.g. for a receiver in a metal cabinet, then an FM radio reception signature element can be given no weight in the overall signature. In other cases, a weighting greater than "none" but less than "full" can be given to a signature element, with a greater weight assigned to more reliable signature elements.

As discussed above, different signatures may be required for different purposes. Each signature may be calculated by giving different weights to the various parameters defined above. The following table illustrate how four different signatures may be defined for four different localities: home, a local neighborhood, a city and a whole country:

| Signature Element | Signature Element Weighting for Desired Degree of Localization | | | |
| --- | --- | --- | --- | --- |
| | Home | Neighborhood | City | Region |
| 1. Common IP Subnet | High | None | None | None |
| 2. Gateway MAC Address | High | None | None | None |
| 3. Path to Internet Server | Medium | None | None | None |
| 4. Reception of Common FM Radio Signal | Low-None | Low-Medium | High | High-Medium [depends on size of the "region"] |
| 5. Communication with Common Cellular Base Station | Low-None | High-Medium | Medium-Low | Medium-Low |
| 6. Path to Home Network Server | High | Low | Low-None | None |
| 7. Packet Fragmentation | Medium | Low-None | Low-None | None |

It should be understood that this table is provided as a means of illustrating the relationships and weights assigned to various environmental or locality parameters to define respective signatures. Other parameters may be used and other weights may be assigned for different signatures, as required.

Moreover, a signature can be calculated over a period of time with periodic updates for each element. Thus a device might have time to determine elements such as RTT which would be defined in terms of the minimum round trip time between the two devices. In wireless networks there can be a significant spread between the minimum, average and maximum round trip times, e.g. the minimum RTT may be seen only once in every 100 attempts.

In another embodiment, the ping used for parameter 3, above, is replaced with a message that is part of the authentication protocol, and the source and sink need to get the same result, for example, a nonce, in their respective replies from the server. This allows the content owner to do geolocation and confine content to, for example, the United States.

Numerous modifications may be made to the invention without departing from its scope as defined in the appended claims.

We claim:

1. A system for delivering content within one of a first and a second predetermined geographic region, said first region being much smaller than said second region comprising:
   a content source selectively transmitting said content; and
   a sink including first and second detectors generating respective first and second parameters related to the geographic location of said sink and a controller assigning first weights to said first and second parameters for said first geographic region and second weights to said first and second parameters for said second region; said controller selectively generating a first signature using said first weights and said first and second parameters to indicate that said sink is in said first predetermined geographic region, said controller selectively generating a second signature using said second weights and said first and second parameters to indicate that said sink is in said second predetermined geographic region;
   wherein said sink is able to utilize said content only if first signature indicates that said sink is in said first predetermined geographic region or if said second signature indicates that said sink is in said second predetermined geographic region.

2. The system of claim 1 wherein said sink transmits said sink signature to said source and said signatures are compared by said source.

3. The system of claim 1 wherein said source transmits said source signature to said sink and said signatures are compared by said sink.

4. The system of claim 1 wherein said first and second parameters are selected from group including common IP subnet, gateway MAC address, path to local Internet server, reception of common radio signals, signals from local cellular base stations, path to a home network server and packet fragmentation.

5. The system of claim 1 wherein at least one of said weights is zero.

6. A device for using content received from a content source located in one of a first geographic area and a second geographic area, said first geographic area being smaller than said second geographic area, said content source being associated with a source signature selected a first source signature indicating that said content source is in said first geographic area or a second source signature indicating that said content is in said second geographic area, said device comprising:
   first and second sink detectors generating respective first and second sink parameters each said first and second sink parameters being characteristic of the geographic area where the sink is located;
   a sink signature generator generating a sink signature selected from one of a first and second sink signatures; said sink signature generator assigning first weights to said first and second sink parameters if said device is in said first geographic location; said sink signature generator assigning second weights to said first and second sink parameters if said device is in said second geographic area, said sink; generator generating said first sink signature using said first and second sink parameters and said first weights, if said device is in said first geographic area; said sink generator generating a second sink signature using said first and second sink parameters and said second weights if said device is in said second geographic area; and
   a sink for receiving and storing or playing said content from said content source, said sink being able to utilize the content only if said device is in the same geographic area as said content source as indicated by said content signature and said sink signature.

7. The device of claim 6 further comprising a transmitter transmitting said content from said content source and a receiver receiving said content.

8. The device of claim 6 further comprising a receiver receiving said content, and wherein said signatures are compared by said sink to determine if said device can utilize said content.

9. The device of claim 6 wherein said first and second parameters are selected from group including common IP subnet, gateway MAC address, path to local Internet server, reception of common radio signals, signals from local cellular base stations, path to a home network server and packet fragmentation.

10. The device of claim 6 wherein at least one of said weights is zero.

11. A method of distributing content from a source within a geographic area comprising the steps of:
    determining at said source and a sink a respective source and sink signature, each of said source and sink signatures being determined from a first parameter and a second parameter and first weights when said source or sink is in a first redetermined geographic area; each said source and sink signatures being determined from said first and second parameter and second weights when said source or sink are in a second predetermined geographic area;
    transmitting said sink signature to said source;
    comparing at said source the sink signature with the source signature to determine if said sink is within the same geographic area as said source; and
    if said sink and source signatures are similar as determined by said comparing step then, in response, transmitting said content to said sink.

12. The method of claim 11 wherein said source signature is transmitted to said sink and said determining is performed at said sink.

13. The method of claim 11 further comprising sending a request from said source to said sink for said sink signature, receiving said sink signature and comparing said source and sink signatures at said source.

14. The method of claim 11 wherein said first and second parameters are selected from group including common IP subnet, gateway MAC address, path to local Internet server, reception of common radio signals, signals from local cellular base stations, path to a home network server and packet fragmentation.

15. The method of claim 11 wherein at least one of said weights is zero.

16. A method for controlling access to content at a user's device located, wherein said user device is at a first location and the content originates at a second location using signatures, each signature being dependent on first and second predetermined parameters and weights associated with said first and second predetermined parameters, said weights being determined by specific geographic areas, said method comprising:
    providing a first signature determined from said first and second parameters and first weights, said first weights being determined based on the location of the sink;
    providing a second signature determined from said first and second parameters and second weights, said second weights being determined based on the location of the source;
    comparing said first signature to said second RF signature; and
    permitting access to said content only if said first signature is substantially similar to said second signature.

17. The method of claim 16 wherein permitting access to said content includes allowing said content to be displayed.

18. The method of claim 16 further comprising receiving said second signature before receiving said content.

19. The method of claim 16 further comprising receiving said second signature together with said content.

20. The system of claim 16 wherein said first and second parameters are selected from group including common IP subnet, gateway MAC address, path to local Internet server, reception of common radio signals, signals from local cellular base stations, path to a home network server and packet fragmentation.

21. The method of claim 16 wherein at least one of said weights is zero.

22. A method of enabling distribution of content from a source to a sink comprising the steps of:
    determining at said sink a first signature corresponding to a first environment associated with the geographic location of the sink, said first signature being determined from first and second parameters and first weights, said first weights being associated with the first environment;
    determining a second signature corresponding to a second environment associated with the geographic location of a source, said second signature being determined from first and second parameters and second weights, said second weights being associated with the second environment;
    comparing said first signature and second signatures; and
    transmitting said content from said source to said sink if said first signature is substantially similar to said second signature.

23. The method of claim 22, further comprising the steps of:
    storing said second signature by a user's device;
    re-creating said first signature after first permitting access to said content; and
    disabling access to said content if the re-created first signature is no longer substantially similar to said first signature.

24. The method of claim 22, further comprising the steps of:
    re-creating said first signature during transmission of said content; and,
    ceasing transmission of said content if said second signature is no longer substantially similar to said first signature.

25. The method of claim 22 wherein said first and second parameters are selected from group including common IP subnet, gateway MAC address, path to local Internet server, reception of common radio signals, signals from local cellular base stations, path to a home network server and packet fragmentation.

26. The method of claim 22 wherein at least one of said weights is zero.

27. A method of controlling content distribution from a source to a sink comprising:
    generating a first signature indicative of the geographic area of said source, said first signature being dependent on a first parameter, a second parameter and first weights assigned to said first and second parameters, said first weights being dependent on the geographic area of said source;
    generating a second signature indicative of the geographic area of said sink, said second signature being dependent on a first parameter, a second parameter and second weights assigned to said first and second parameters, said second weights being dependent on the geographic location of said source;
    comparing the two signatures;
    determining if said two signatures are substantially similar thereby indicating that said source and said sink are in the same geographic area; and
    delivering content from the source to the sink only if said signatures are substantially similar.

28. The method of claim 27 wherein said first and second parameters are selected from group including common IP subnet, gateway MAC address, path to local Internet server, reception of common radio signals, signals from local cellular base stations, path to a home network server and packet fragmentation.

29. The method of claim 27 wherein at least one of said weights is zero.

* * * * *